(12) United States Patent
Civlin

(10) Patent No.: US 6,772,294 B2
(45) Date of Patent: Aug. 3, 2004

(54) METHOD AND APPARATUS FOR USING A NON-COMMITTING DATA CACHE TO FACILITATE SPECULATIVE EXECUTION

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 197 days.

(21) Appl. No.: 10/191,937

(22) Filed: Jul. 8, 2002

(65) Prior Publication Data
US 2004/0006672 A1 Jan. 8, 2004

(51) Int. Cl.[7] .............................................. G06F 12/08
(52) U.S. Cl. ....................... 711/137; 711/144; 711/145; 711/122
(58) Field of Search ................................. 711/137, 122, 711/144, 143; 712/233, 234, 239

(56) References Cited

U.S. PATENT DOCUMENTS

| 5,526,510 A | * | 6/1996 | Akkary et al. ............... 711/133 |
| 5,845,103 A | * | 12/1998 | Sodani et al. ................ 712/216 |
| 6,119,203 A | * | 9/2000 | Snyder et al. ............... 711/137 |
| 6,647,467 B1 | * | 11/2003 | Dowling ...................... 711/140 |
| 2002/0073301 A1 | * | 6/2002 | Kahle et al. ................. 712/235 |
| 2002/0087794 A1 | * | 7/2002 | Jouppi et al. ............... 711/126 |
| 2003/0182542 A1 | * | 9/2003 | Davies et al. ............... 712/235 |

* cited by examiner

Primary Examiner—Hiep T. Nguyen
(74) Attorney, Agent, or Firm—Park, Vaughan & Fleming LLP

(57) ABSTRACT

One embodiment of the present invention provides a system that facilitates speculative execution of instructions within a computer system. Upon encountering a stall during execution of an instruction stream, the system synchronizes a cache containing data that is being operated on by the instruction stream. Next, the system configures the cache so that the cache operates as before except that changes to cache lines are not propagated to lower levels of the memory system. The system then speculatively executes a subsequent portion of the instruction stream without waiting for the event that caused the stall to be resolved. In this way, the speculative execution can only change data within the cache, and these changes are not propagated to lower levels of the memory system unless a subsequent commit operation takes place.

30 Claims, 3 Drawing Sheets

METHOD AND APPARATUS FOR USING A NON-COMMITTING DATA CACHE TO FACILITATE SPECULATIVE EXECUTION

BACKGROUND

1. Field of the Invention

The present invention relates to the design of computer systems. More specifically, the present invention relates to a method and an apparatus for using a non-committing data cache to facilitate speculative execution of program instructions.

2. Related Art

Modern computer systems use many techniques to increase performance. For example, recent advances in compiler technology presently make it possible to exploit instruction-level parallelism and to reorder code to facilitate faster execution. Although such compiler optimizations can significantly increase computer system performance, additional performance gains through compiler optimizations are proving harder to come by.

Speculative execution is another approach to increasing computer system performance. Speculative execution occurs when a computer encounters a stall condition and continues executing instructions speculatively, instead of waiting for the stall condition to be resolved. Stalls can occur for a variety of reasons. For example, the instruction stream can stall while a branch condition is resolved or because an instruction (such as a multiply) takes a significant amount of time to complete. At some point, the condition for the stall will be resolved. At this point, the system must decide whether to commit the results generated during the speculative execution or to discard the results.

Note that the speculative execution process cannot overwrite data values without first saving the data values, because the data values may have to be restored if the results of the speculative execution subsequently need to be discarded. Hence, systems that support speculative execution must ensure that data values that are modified in registers, cache memory, or main memory must somehow be saved.

Existing techniques for saving data values during speculative execution typically involve providing additional memory for storing temporary results as well as circuitry to coordinate the process of saving and restoring data values. This additional memory and circuitry can greatly complicate computer system design and can increase computer system cost. Moreover, the process of saving and restoring data values can be time-consuming, which can potentially mitigate the performance advantages of speculative execution.

Hence, what is needed is a method and an apparatus that facilitates speculative execution within a computer system without the problems listed above.

SUMMARY

One embodiment of the present invention provides a system that facilitates speculative execution of instructions within a computer system. Upon encountering a stall during execution of an instruction stream, the system synchronizes a cache containing data that is being operated on by the instruction stream. Next, the system configures the cache so that the cache operates as before except that changes to cache lines are not propagated to lower levels of the memory system. The system then speculatively executes a subsequent portion of the instruction stream without waiting for the event that caused the stall to be resolved. In this way, the speculative execution can only change data within the cache, and these changes are not propagated to lower levels of the memory system unless a subsequent commit operation takes place.

In a variation on this embodiment, synchronizing the cache involves storing dirty lines within the cache to a lower-level cache.

In a variation on this embodiment, synchronizing the cache involves storing dirty lines within the cache to a main memory.

In a variation on this embodiment, speculative execution commences after the process of synchronizing the cache completes.

In a variation on this embodiment, speculative execution commences before the process of synchronizing the cache completes.

In a variation on this embodiment, after the event that caused the stall is resolved, the system determines if changes made to data during speculative execution can be committed. If so, the system commits the changes made during speculative execution. Otherwise, the system discards the changes made during speculative execution.

In a further variation, committing the changes involves storing dirty cache lines that have been modified during speculative execution to lower levels of the memory system.

In a variation on this embodiment, discarding the changes involves invalidating dirty cache lines that have been modified during speculative execution.

In a variation on this embodiment, the system additionally saves data from the processor registers prior to commencing speculative execution.

In further variation, the system restores the saved data to processor registers after completing speculative execution.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer

Figure 1:
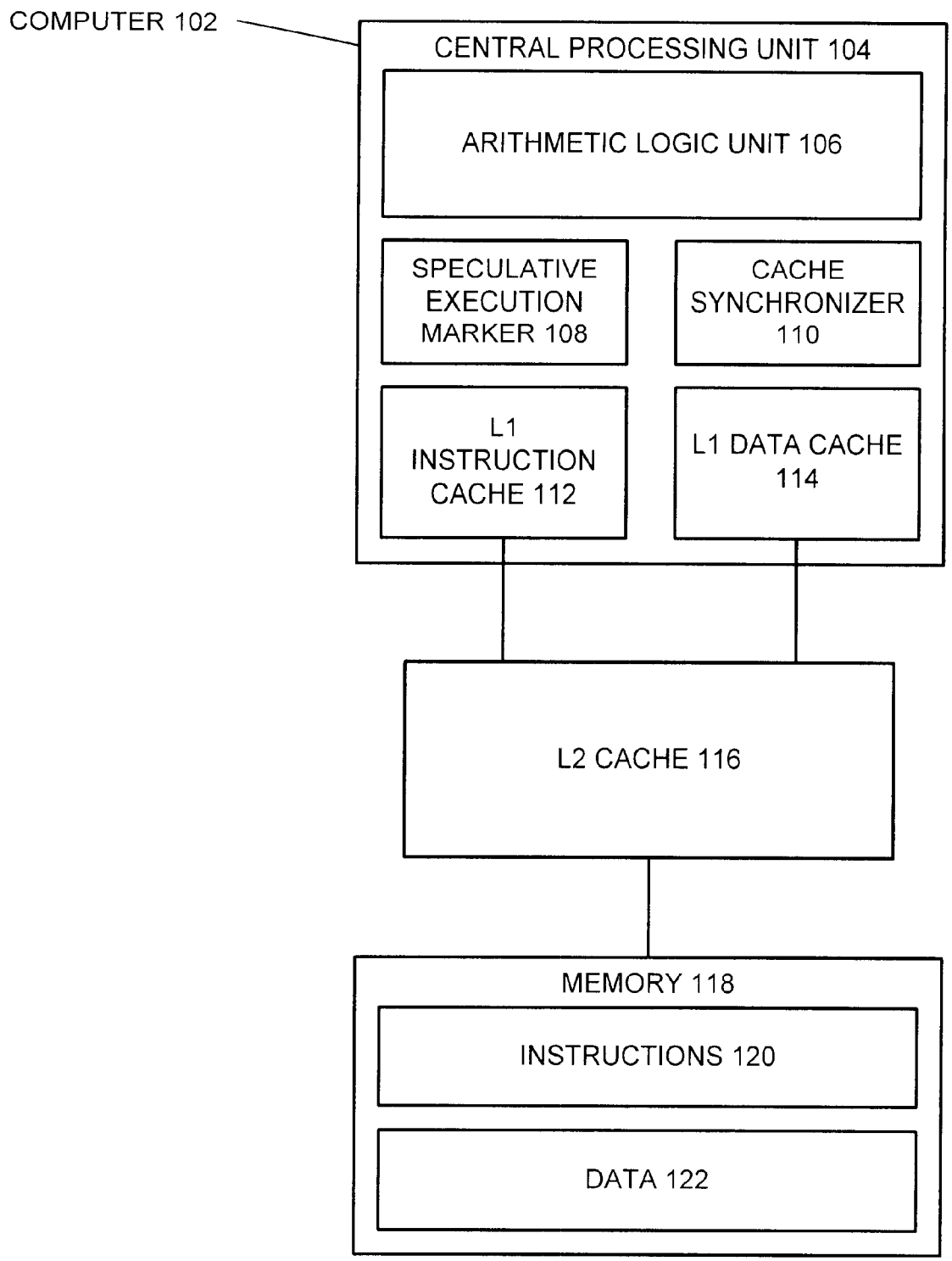
FIG. 1 illustrates a computer in accordance with an embodiment of the present invention.

FIG. 1 illustrates a computer 102 in accordance with an embodiment of the present invention. Computer 102 includes central processing unit 104, level-two (L2) cache 116, and memory 118. Central processing unit 104 generally performs computations and controls peripherals for computer 102.

L2 cache 116 is a lower-level cache that forms part of the memory system. Note that some embodiments may have more than two levels of cache memory.

Memory 118 includes instructions 120 and data 122 that are operated on by central processing unit 104. Central processing unit 104 includes arithmetic/logic unit 106, speculative execution marker 108, cache synchronizer 110, level-one (L1) instruction cache 112, and L1 data cache 114. Note that in some embodiments of the present invention speculative execution marker 108 and cache synchronizer 110 can be implemented outside of central processing unit 104.

Arithmetic/logic unit 106 performs the arithmetic and logical operations specified by instructions 120 from memory 118. L1 data cache 114 is a high-speed memory that stores recently accessed data. When central processing unit 104 reads data from memory, the system first checks L1 data cache 114 to determine if the data is present in L1 data cache 114. If not, the line containing the data is transferred from a lower-level cache or from main memory 118 into L1 data cache 114. When a data write occurs from central processing unit 104, the data is written to L1 data cache 114 and is typically also written to a lower level cache or to main memory 118 at the same time. This type of cache is referred to as a "write-through" cache. L1 data cache 114 and the associated L1 instruction cache 112 are well known in the art and will not be described further herein.

Speculative execution marker 108 can be set by central processing unit 104 and controls the write-through operation of L1 data cache 114 as described below. Speculative execution marker 108 can be set and cleared by central processing unit 104. Central processing unit 104 "sets" execution marker 108 when a stall is detected in the instruction stream being processed. CPU 104 "clears" execution marker 108 when the stall has been resolved.

Cache synchronizer 110 flushes unwritten data in L1 data cache 114 to a lower-level cache, such as L2 cache 116, or to memory 118 upon detecting that speculative execution marker 108 has been set. After L1 data cache 114 has been synchronized, central processing unit 104 can speculatively execute instructions that operate on data within data cache 114. Note that the compiler that compiles the application program may include hints as to what code should be speculatively executed. When speculative execution marker 108 is set and after L1 data cache 114 has been synchronized, read operations requested by arithmetic/logic unit 106 are processed normally by retrieving new data from memory 118 or L2 cache 116. However, write operations modify data items in L1 data cache 114 only, and are not propagated to L2 cache 116 or memory 118. Note that if L1 data cache 114 needs to store a dirty cache line to make room for a new cache line during a read of a cache line from memory 118 or L2 cache 116, speculative execution is halted.

Central processing unit 104 may save internal registers prior to starting speculative execution. Saving internal registers can be accomplished in a variety of ways, including switching to shadow registers or writing data from the registers to some dedicated memory.

When the reason for the stall has been resolved, the system determines whether to commit or discard the data changes made to L1 data cache 114 during speculative execution. If the system determines that these changes should be committed, the changes are written to memory 118 or L2 cache 116. Otherwise, the changed cache lines within L1 data cache 114 are invalidated; thereby requiring a new read from memory 118 or from L2 cache 116 to access the changed cache lines again. After the changes have been committed or discarded, central processing unit 104 clears speculative execution marker 108 and continues executing code normally.

Data Paths

Figure 2:
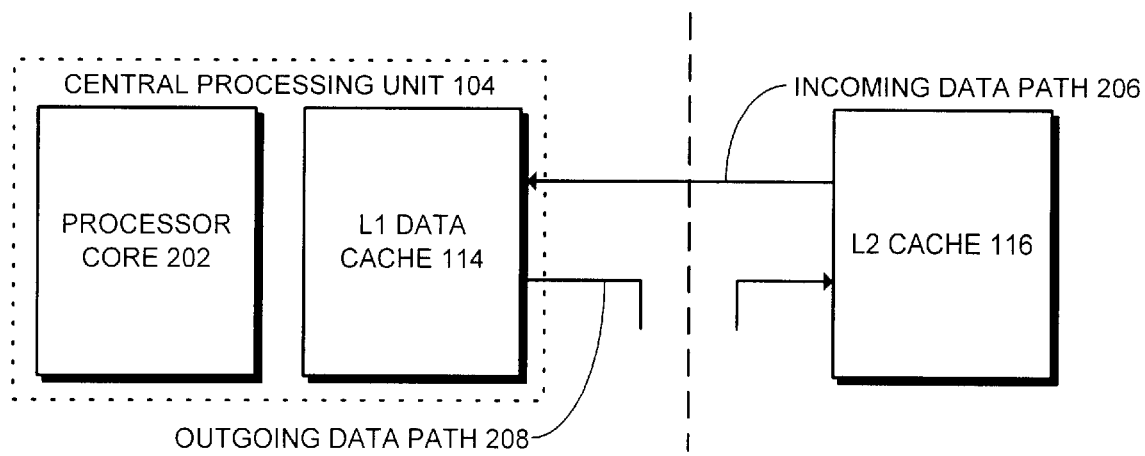
FIG. 2 illustrates data paths between the data cache and external memory in accordance with an embodiment of the present invention.

FIG. 2 illustrates data paths between the data cache and external memory in accordance with an embodiment of the present invention. Note that there is an incoming data path 206 and an outgoing data path 208 between L1 data cache 114 and L2 cache 116. Also note that these paths are representative of paths between any two levels of cache and between a cache level and memory 118. Alternative embodiments of the present invention allow speculative execution to proceed with write operations allowed to any level of cache prior to memory 118.

Incoming data path 206 supplies data to L1 data cache 114 during both normal execution and speculative execution. Outgoing data path 208, however, is blocked during speculative execution, thereby preventing data write operations to propagate to L2 cache 116 or to memory 118. Note that processor core 202 includes the portions of central processing unit 104 other than L1 data cache 114.

Performing Speculative Execution

Figure 3:
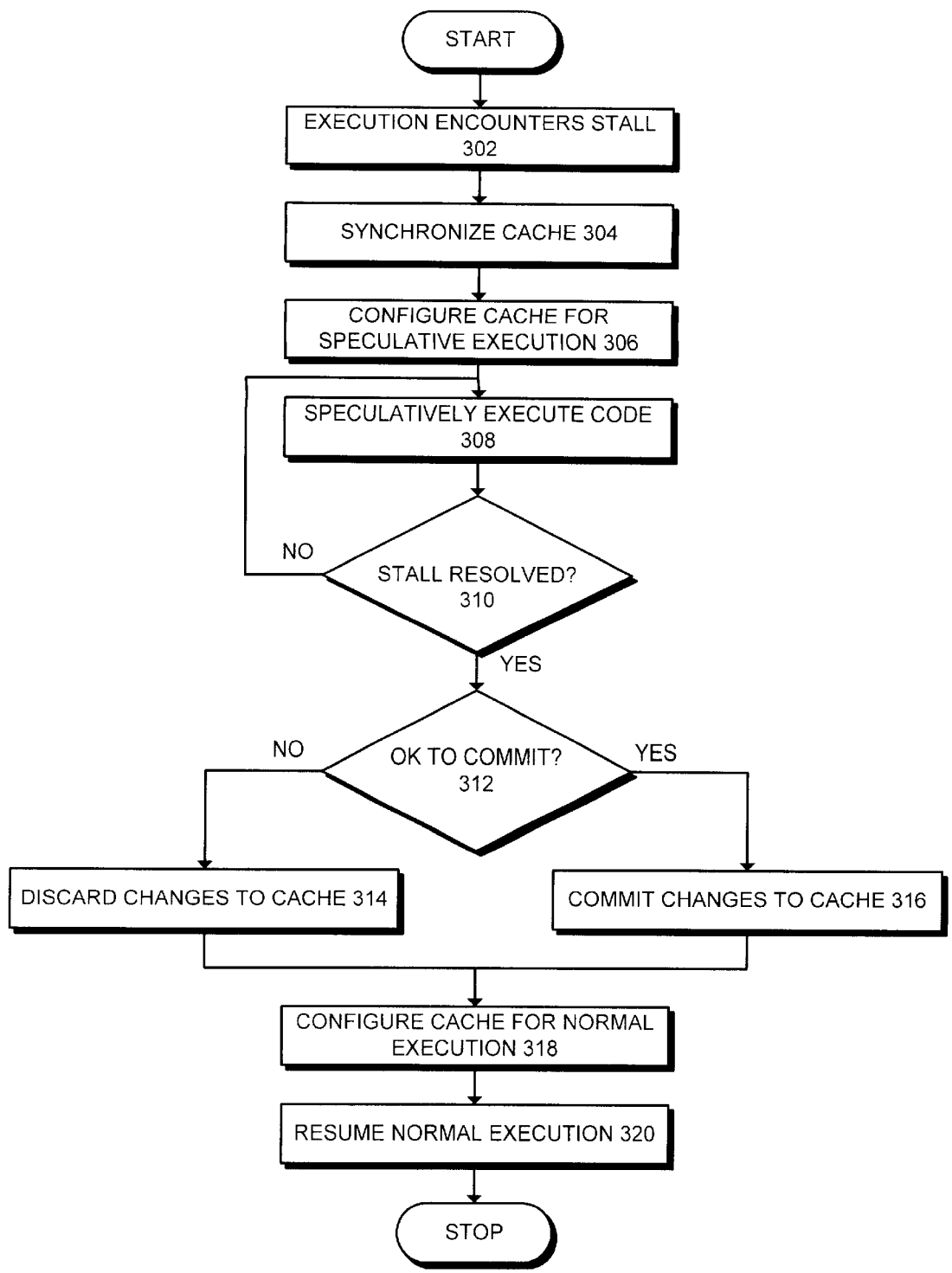
FIG. 3 is a flowchart illustrating the process of performing speculative execution of instructions in accordance with an embodiment of the present invention.

FIG. 3 is a flowchart illustrating the process of performing speculative execution in accordance with an embodiment of the present invention. The system starts when program execution within central processing unit 104 encounters a stall (step 302). Upon detecting the stall, cache synchronizer 110 synchronizes L1 data cache 114 (step 304). After L1 data cache 114 has been synchronized, central processing unit 104 configures L1 data cache 114 for speculative execution by setting speculative execution marker 108 (step 306). Note that synchronization does not have to be complete before central processing unit 104 begins speculative execution. What is necessary is that portions of L1 data cache 114 that are to be written to during speculative execution have been synchronized before writes are allowed.

Once L1 data cache 114 has been configured for speculative execution, central processing unit 104 starts speculatively executing code (step 308). During speculative execution, central processing unit 104 determines if the cause of the stall has been resolved (step 310). If not, the process returns to step 308 to continue speculative execution of code.

If the stall has been resolved, central processing unit 104 next determines if the changes made to data in L1 data cache 114 during speculative execution should be committed (step 312). If so, central processing unit 104 commits the changes made to L1 data cache 114 (step 316). Otherwise, central processing unit 104 discards the changes (step 314).

After committing or discarding the changes, central processing unit 104 reconfigures L1 data cache 114 for normal execution (step 318). Finally, arithmetic/logic unit 106 resumes normal execution of the program code (step 320).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating speculative execution of instructions within a computer system, comprising:
   encountering a stall during execution of an instruction stream; and in response to the stall,
   synchronizing a cache containing data operated on by the instruction stream,
   configuring the cache so that the cache operates as before except that changes to cache lines are not propagated to lower levels of a memory system unless a subsequent commit operation takes place, and
   speculatively executing a subsequent portion of the instruction stream without waiting for an event that caused the stall to be resolved, wherein the speculative execution operates on data within the cache.

2. The method of claim 1, wherein synchronizing the cache involves storing dirty cache lines within the cache to a lower-level cache.

3. The method of claim 1, wherein synchronizing the cache involves storing dirty cache lines within the cache to a main memory.

4. The method of claim 1, wherein speculative execution commences after the process of synchronizing the cache completes.

5. The method of claim 1, wherein speculative execution commences before the process of synchronizing the cache completes.

6. The method of claim 1, wherein after the event that caused the stall is resolved, the method further comprises:
   determining if changes made to data during speculative execution can be committed; and
   if changes can be committed,
      committing changes made during speculative execution, otherwise,
      discarding changes made during speculative execution.

7. The method of claim 6, wherein committing the changes involves storing dirty cache lines that have been modified during speculative execution to lower levels of the memory system.

8. The method of claim 6, wherein discarding the changes involves invalidating dirty cache lines that have been modified during speculative execution.

9. The method of claim 1, further comprising saving data from processor registers prior to commencing speculative execution.

10. The method of claim 9, further comprising restoring saved data to processor registers after completing speculative execution.

11. A computer-readable storage medium storing instructions that when executed by a computer cause the computer to perform a method for facilitating speculative execution of instructions within a computer system, the method comprising:
    encountering a stall during execution of an instruction stream; and in response to the stall,
    synchronizing a cache containing data operated on by the instruction stream,
    configuring the cache so that the cache operates as before except that changes to cache lines are not propagated to lower levels of a memory system unless a subsequent commit operation takes place, and
    speculatively executing a subsequent portion of the instruction stream without waiting for an event that caused the stall to be resolved, wherein the speculative execution operates on data within the cache.

12. The computer-readable storage medium of claim 11, wherein synchronizing the cache involves storing dirty cache lines within the cache to a lower-level cache.

13. The computer-readable storage medium of claim 11, wherein synchronizing the cache involves storing dirty cache lines within the cache to a main memory.

14. The computer-readable storage medium of claim 11, wherein speculative execution commences after the process of synchronizing the cache completes.

15. The computer-readable storage medium of claim 11, wherein speculative execution commences before the process of synchronizing the cache completes.

16. The computer-readable storage medium of claim 11, wherein after the event that caused the stall is resolved, the method further comprises:
    determining if changes made to data during speculative execution can be committed; and
    if changes can be committed,
       committing changes made during speculative execution, otherwise,
    discarding changes made during speculative execution.

17. The computer-readable storage medium of claim 16, wherein committing the changes involves storing dirty cache lines that have been modified during speculative execution to lower levels of the memory system.

18. The computer-readable storage medium of claim 16, wherein discarding the changes involves invalidating dirty cache lines that have been modified during speculative execution.

19. The computer-readable storage medium of claim 11, the method further comprising saving data from processor registers prior to commencing speculative execution.

20. The computer-readable storage medium of claim 19, the method further comprising restoring saved data to processor registers after completing speculative execution.

21. An apparatus for facilitating speculative execution of instructions within a computer system, comprising:
    a stall encountering mechanism that is configured to encounter a stall during execution of an instruction stream;
    a synchronizing mechanism that is configured to synchronize a cache containing data operated on by the instruction stream;
    a configuring mechanism that is configured to configure the cache so that the cache operates as before except that changes to cache lines are not propagated to lower levels of a memory system unless a subsequent commit operation takes place; and
    an executing mechanism that is configured to speculatively execute a subsequent portion of the instruction stream without waiting for an event that caused the stall to be resolved, wherein the speculative execution operates on data within the cache.

22. The apparatus of claim 21, wherein synchronizing the cache involves storing dirty cache lines within the cache to a lower-level cache.

23. The apparatus of claim 21, wherein synchronizing the cache involves storing dirty cache lines within the cache to a main memory.

24. The apparatus of claim 21, wherein speculative execution commences after the process of synchronizing the cache completes.

25. The apparatus of claim 21, wherein speculative execution commences before the process of synchronizing the cache completes.

26. The apparatus of claim 21, further comprising:

a determining mechanism that is configured to determine if changes made to data during speculative execution can be committed;

a committing mechanism that is configured to commit changes made during speculative execution if changes made to data during speculative execution can be committed; and a discarding mechanism that is configured to discard changes made during speculative execution if changes made to data during speculative execution can not be committed.

27. The apparatus of claim 26, wherein committing the changes involves storing dirty cache lines that have been modified during speculative execution to lower levels of the memory system.

28. The apparatus of claim 26, wherein discarding the changes involves invalidating dirty cache lines that have been modified during speculative execution.

29. The apparatus of claim 21, further comprising a saving mechanism that is configured to save data from processor registers prior to commencing speculative execution.

30. The apparatus of claim 29, further comprising a restoring mechanism that is configured to restore saved data to processor registers after completing speculative execution.

* * * * *